US009296283B2

(12) United States Patent
Nagashima et al.

(10) Patent No.: US 9,296,283 B2
(45) Date of Patent: Mar. 29, 2016

(54) SUNROOF DEVICE

(71) Applicant: AISIN SEIKI KABUSHIKI KAISHA, Kariya-shi, Aichi-ken (JP)

(72) Inventors: Yoji Nagashima, Kariya (JP); Yusuke Kokubo, Toyota (JP); Shinichi Hiramatsu, Chiryu (JP); Yoshitaka Ide, Anjo (JP); Kazushige Kawamura, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/402,096

(22) PCT Filed: May 14, 2013

(86) PCT No.: PCT/JP2013/063411
§ 371 (c)(1),
(2) Date: Nov. 18, 2014

(87) PCT Pub. No.: WO2013/176001
PCT Pub. Date: Nov. 28, 2013

(65) Prior Publication Data
US 2015/0130229 A1    May 14, 2015

(30) Foreign Application Priority Data

May 22, 2012    (JP) ................................. 2012-116602

(51) Int. Cl.
*B60J 7/02*    (2006.01)
*B60J 7/057*    (2006.01)
*B60J 7/043*    (2006.01)

(52) U.S. Cl.
CPC ................ *B60J 7/0573* (2013.01); *B60J 7/043* (2013.01)

(58) Field of Classification Search
CPC ........... B60J 7/057; B60J 7/043; B60J 7/0573
USPC ...................................... 296/214, 216.01–224
See application file for complete search history.

(56) References Cited

U.S. PATENT DOCUMENTS

| 5,398,449 A | 3/1995 | Kobrehel et al. |
| 2002/0041113 A1 | 4/2002 | Hori et al. |

(Continued)

FOREIGN PATENT DOCUMENTS

| DE | 2912666 | 10/1979 |
| JP | 58-54175 A | 3/1983 |

(Continued)

OTHER PUBLICATIONS

International Preliminary Report on Patentability for PCT/JP2013/063411 dated Nov. 25, 2014.

*Primary Examiner* — Dennis H Pedder
(74) *Attorney, Agent, or Firm* — Finnegan, Henderson, Farabow, Garrett & Dunner, LLP

(57) ABSTRACT

A sunroof device comprising: a drive cable having driving teeth arranged in a longitudinal direction and being driven to move in the vehicle front-rear direction along a guiderail; and a sliding member that controls the posture of a functional bracket together with a movable panel, in conjunction with movement in the vehicle front-rear direction. The sunroof device also comprises: driven teeth formed on the sliding member, that are meshed with the driving teeth and restrict relative movement of the drive cable and the sliding member in the vehicle front-rear direction; and a mounted portion formed on the guiderail. The drive cable and the sliding member, in which the driving teeth are meshed with the driven teeth, are mounted on the mounted portion, and the mounted portion holds these in the vehicle lateral and vertical directions.

5 Claims, 9 Drawing Sheets

(56) References Cited

U.S. PATENT DOCUMENTS

| | | |
|---|---|---|
| 2003/0141749 A1 | 7/2003 | Friedrich et al. |
| 2007/0013210 A1* | 1/2007 | Sawada et al. ............ 296/216.01 |
| 2007/0182219 A1* | 8/2007 | Mori et al. .................... 296/223 |
| 2008/0191519 A1 | 8/2008 | Sawada et al. |
| 2012/0112496 A1 | 5/2012 | Maruyama |

FOREIGN PATENT DOCUMENTS

| | | |
|---|---|---|
| JP | 2002-154329 A | 5/2002 |
| JP | 3650327 | 2/2005 |

* cited by examiner

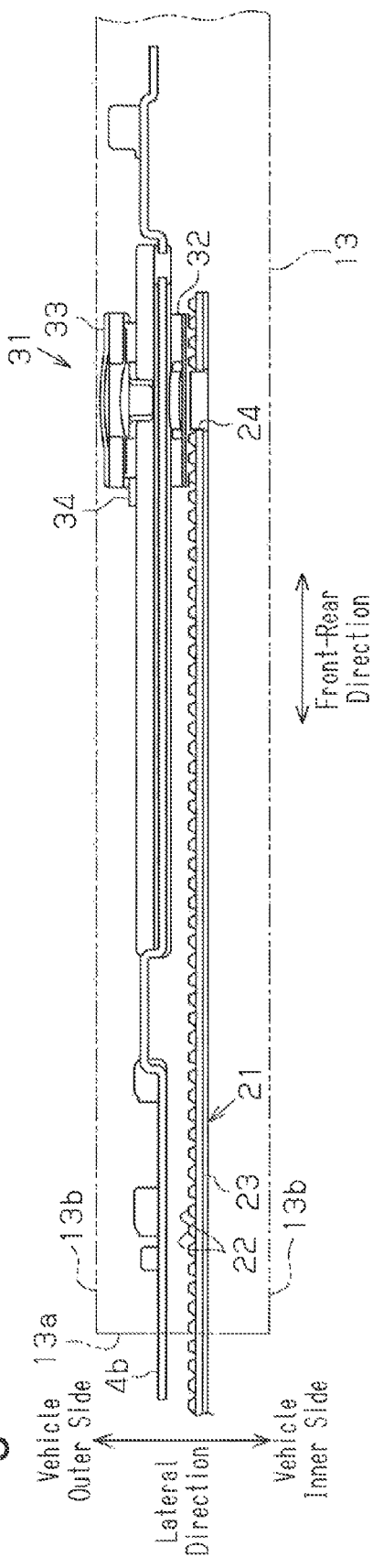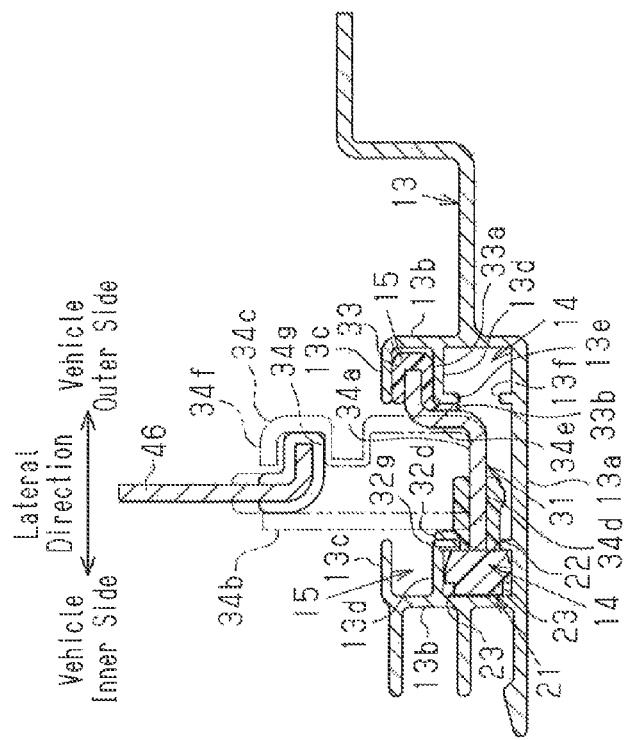

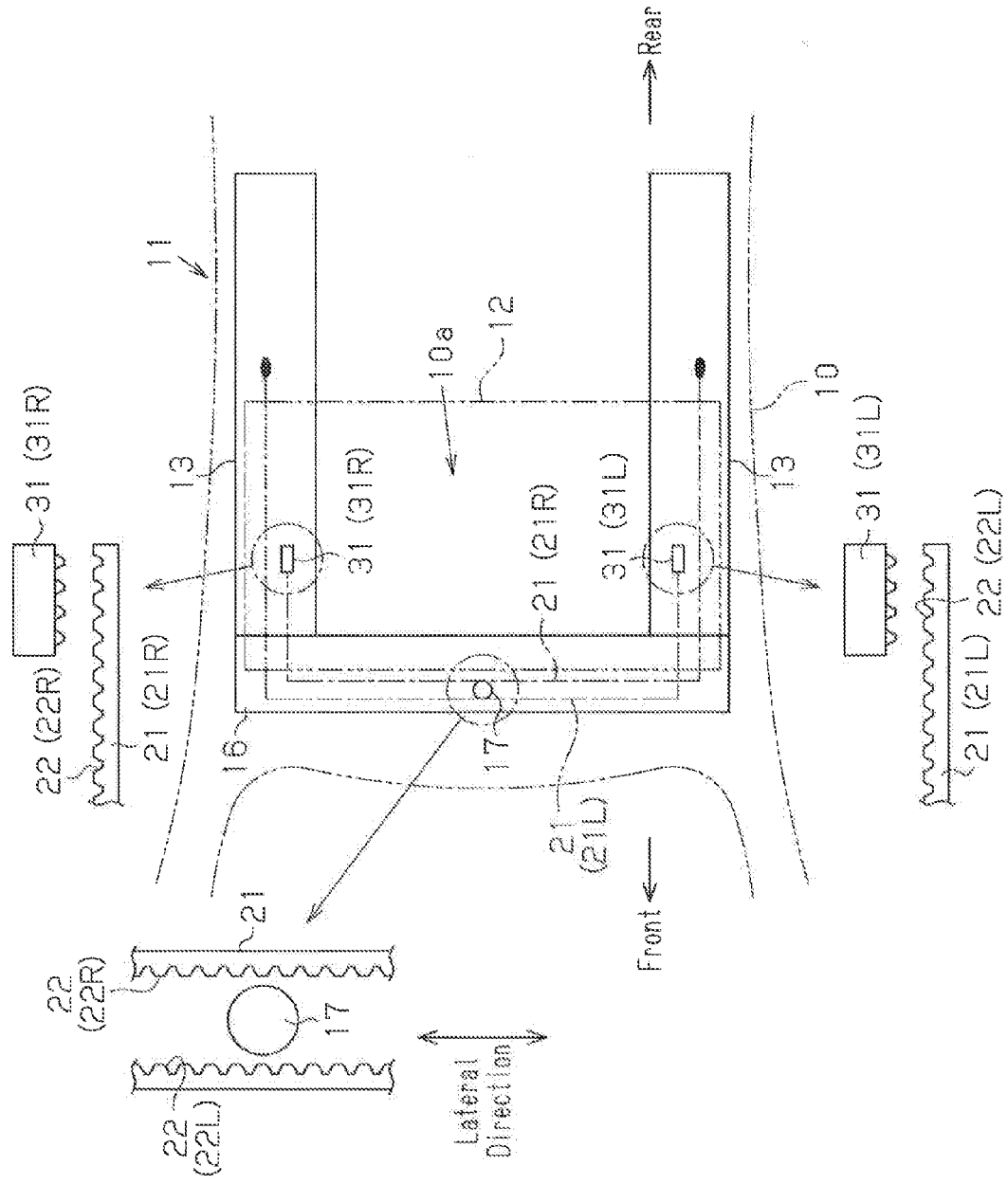

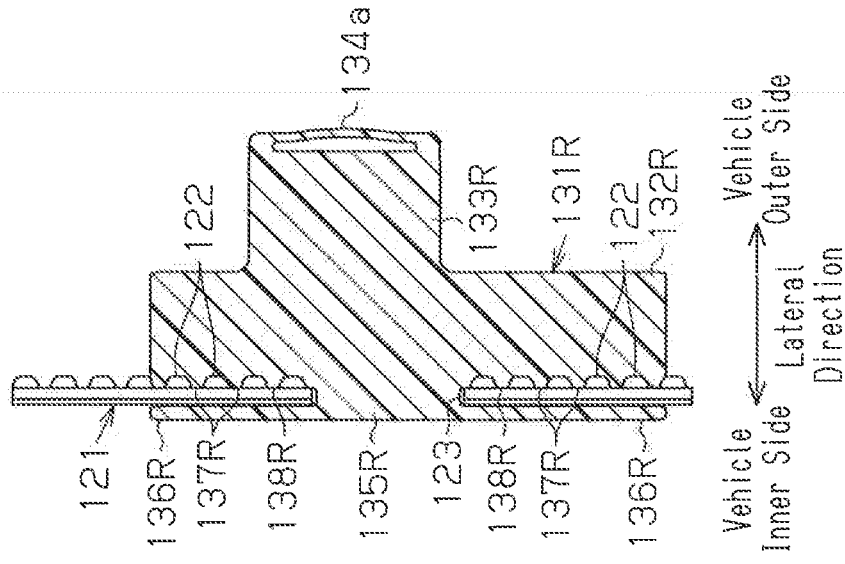
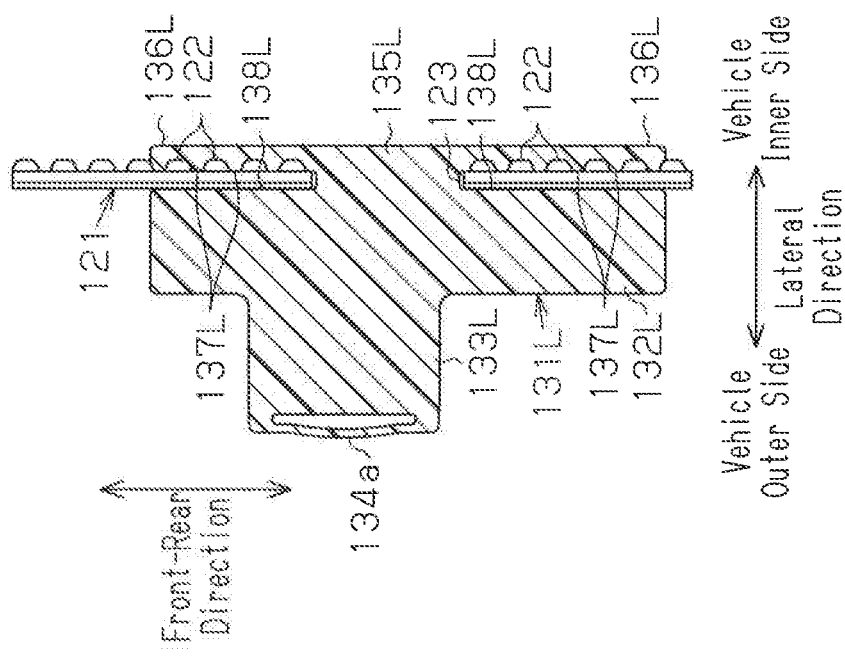

US 9,296,283 B2

SUNROOF DEVICE

TECHNICAL FIELD

The present invention relates to a sunroof device that opens and closes an opening formed in a roof of a vehicle with a movable panel.

BACKGROUND ART

In the prior art, for example, patent document 1 describes such a known sunroof device. As shown in FIG. 11, the sunroof device includes a sliding member 91 arranged in a movable manner in the front-rear direction of a vehicle along a guiderail, which is arranged in an opening formed in a roof of the vehicle along a lateral edge. The sliding member 91 includes a plurality (five) of engaging claws 91a arranged in the front-rear direction of the vehicle and a support portion 91b projecting in the vertical direction of the vehicle.

Each engaging claw 91a of the sliding member 91 is fitted to a corresponding one of a plurality (five) of engaging holes 92a formed in a straight teeth rack belt 92, which serves as a drive cable driven to move in the front-rear direction of the vehicle along the guiderail. Thus, movement of the straight teeth rack belt 92 in the front-rear direction of the vehicle integrally moves the sliding member 91 in the front-rear direction.

The support portion 91b of the sliding member 91 is coupled to a functional bracket 93 fixed to a lateral edge of a movable panel. As the sliding member 91 moves in the front-rear direction of the vehicle, the position of the functional bracket 93 is controlled together with the position of the movable panel to open and close the opening.

PRIOR ART DOCUMENT

Patent Document

Patent Document 1: Japanese Patent No. 3650327 (paragraph [0011] and FIG. 3)

SUMMARY OF THE INVENTION

Problems that are to be Solved by the Invention

In patent document 1, the straight teeth rack belt 92 includes the engaging holes 92a, which receive the engaging claws 91a of the sliding member 91. This lowers the strength of the straight teeth rack belt 92 and limits miniaturization when ensuring the strength.

It is an object of the present invention to provide a sunroof device that allows for further miniaturization of a drive cable, which is coupled to a sliding member used to control the position of a movable panel, without lowering the strength of the drive cable.

Means for Solving the Problem

To solve the above problem, a sunroof device includes a functional bracket, which is configured to support a lateral edge of a movable panel that opens and closes an opening formed in a roof portion of a vehicle, a guiderail, which is configured to be located at a lateral edge of the opening and extend in the front-rear direction of the vehicle, a drive cable, which includes driving teeth aligned in a longitudinal direction and is driven to move along the guiderail in the front-rear direction of the vehicle, a sliding member, which is linked to the functional bracket and arranged to be movable in the front-rear direction of the vehicle along the guiderail and controls a position of the functional bracket together with the movable panel when moving in the front-rear direction of the vehicle, driven teeth, which are formed on the sliding member and meshed with the driving teeth and restrict relative movement of the drive cable and the sliding member in the front-rear direction of the vehicle, and a mounted portion, which is formed on the guiderail. The drive cable and the sliding member, in which the driving teeth are meshed with the driven teeth, are mounted on the mounted portion, and the mounted portion holds the drive cable and the sliding member in the lateral and vertical directions of the vehicle.

In this structure, the drive cables and the sliding members are held in the front-rear direction of the vehicle by meshing the driving teeth with the driven teeth. The drive cable and the sliding member, in which the driving teeth are meshed with the driven teeth, are mounted on the mounted portion and held in the lateral and vertical directions of the vehicle. In this manner, the sliding member may be moved in the front-rear direction of the vehicle integrally with the drive cable, which is driven to move in the front-rear direction of the vehicle. In this case, by using the driving teeth without basically forming a hole in the drive cable, the drive cable and the sliding member may be integrally moved in the front-rear direction of the vehicle. This reduces the drive cable in size without decreasing the strength of the drive cable.

Preferably, in the sunroof device, the drive cable includes teeth arranged at fixed intervals. The sunroof device includes a drive source, which is meshed with the teeth and drives the drive cable. The teeth and the driving teeth have the same shape.

This structure allows for the shape of the teeth that are meshed with the drive source to be used and eliminates the need for a new shape for the driving teeth in the drive cable.

Preferably, the sunroof device includes a positioning portion that is located in the drive cable and the sliding member and determines where the driving teeth are meshed with the driven teeth.

In this structure, the positioning portion meshes the driving teeth with the driven teeth. This meshes the driven teeth with the driving teeth at the desirable position in the front-rear direction of the vehicle.

Preferably, the sunroof device includes a holding portion that holds the drive cable and the sliding member in a temporarily coupled manner.

This structure allows the holding portion to easily hold the drive cable and the sliding member in a temporarily coupled manner and improves coupling features when mounted on the guiderail (mounted portion).

Preferably, the sunroof device includes a slot, which is formed in a heightwise edge of the drive cable and opens in the lateral direction of the vehicle, and a positioning protrusion, which protrudes from the sliding member in the lateral direction of the vehicle opposed to the slot. The positioning protrusion is fitted to the slot when the driving teeth are meshed with the driven teeth.

In this structure, the driving teeth are meshed with the driven teeth when the positioning protrusion is fitted to the slot. This meshes the driven teeth with the driving teeth at the desirable position in the front-rear direction of the vehicle.

Preferably, in the sunroof device, the positioning protrusion is loosely fitted to the slot. The sunroof device includes a step, which is formed on the heightwise edge of the drive cable where the step is formed along substantially the entire length in the longitudinal direction and decreases the height of the drive cable at a side separated from the sliding member, and two hook projections, which project toward the front and rear directions from a lateral, distal end of the positioning protrusion and are hooked to the step at both sides of the slot to sandwich the slot in the front-rear direction of the vehicle.

In this structure, for example, prior to the attachment to the guiderail (mounted portion), when the drive cable is temporarily coupled to the sliding member with the driving teeth meshing the driven teeth, the two hook projections are each hooked to the step when the positioning protrusions are loosely fitted to the slots. This allows the holding portion to easily hold the drive cable and the sliding member in a temporarily coupled manner and improves coupling features when mounted on the guiderail (mounted portion).

Preferably, in the sunroof device, the sliding member includes a resin shoe member, which includes shoe side teeth and is capable of sliding in the front-rear direction of the vehicle along the guiderail, and a metal plate member, which includes plate side teeth and is attached to the shoe member and linked to the functional bracket. The driven teeth are formed by cooperation of the shoe side teeth and the plate side teeth, which are overlapped in the vertical direction of the vehicle.

In this structure, the driven teeth include the metal plate side teeth and are meshed with the driving teeth. This ensures the support strength of the sliding member and the drive cable in the front-rear direction of the vehicle in a preferred manner.

Preferably, in the sunroof device, the shoe side teeth include a tabular fitted portion through which the plate side teeth extend.

This structure allows the shoe member, in which the plate side teeth extend through the fitted portion, to support the plate side teeth in a further ensured manner.

Preferably, in the sunroof device, the sliding member includes two extension portions, which extend toward the front and rear directions of the vehicle from a distal end of the positioning protrusion, the driven teeth are formed on one of the two extension portions and two opposing portions, which are portions of the sliding member opposed to the two extension portions in the lateral direction of the vehicle, and the other one of the two extension portions and the two opposing portions are configured to hold a rear surface of the drive cable in which the driving teeth are meshed with the driven teeth.

In this structure, in the drive cable, the driving teeth are meshed with the driven teeth. The rear surface of the drive cable is held by the two opposing portions or the two extension portions and temporarily coupled to the sliding member. This improves coupling features when the drive cable and the sliding member, in which the driving teeth are meshed with the driven teeth, are mounted on the guiderail (mounted portion).

Effects of the Invention

The present invention has an effect allowing for further miniaturization of the drive cable, which is coupled to the sliding member used to control the position of the movable panel, without lowering the strength of the drive cable.

BRIEF DESCRIPTION OF THE DRAWINGS

FIGS. 1A and 1B are a plan view and a cross-sectional side view showing a first embodiment of the present invention.

FIG. 7 is a schematic plan view showing the roof of the vehicle.

FIGS. 10A and 10B are cross-sectional views taken along lines 10A-10A and 10A-10B.

EMBODIMENTS OF THE INVENTION

First Embodiment

A first embodiment of a sunroof device will now be described. Hereinafter, the front-rear direction of a vehicle is referred to as "front-rear direction" and the upper side and the lower side in the vertical direction of the vehicle are respectively referred to as "upper side" and "lower side." Also, the inner side in the lateral direction of the vehicle directed toward the inner side of a passenger compartment is referred to as "vehicle inner side" and the outer side in the lateral direction of the vehicle directed toward the outer side of the passenger compartment is referred to as "vehicle outer side."

Figure 6:
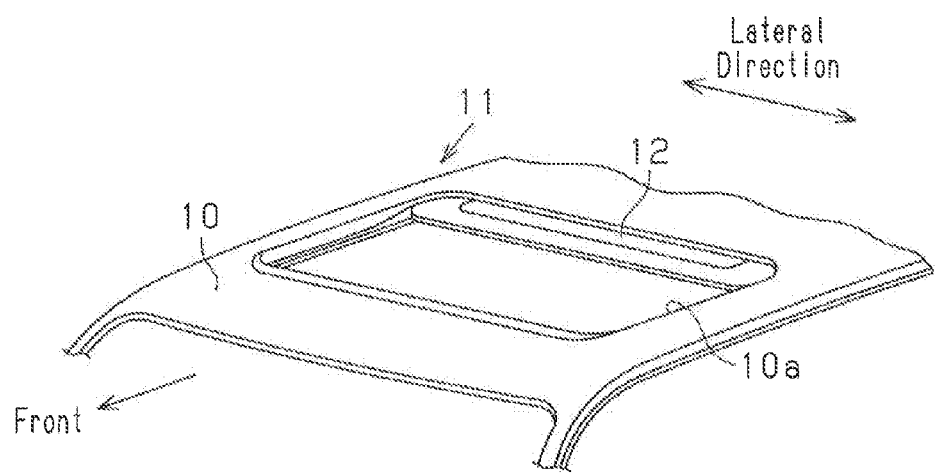
FIG. 6 is a perspective view showing a roof of the vehicle.

As shown in FIG. 6, a tetragonal roof opening 10a, which serves as an opening, is formed in a roof 10, which serves as a roof portion of a vehicle, such as an automobile. Also, a sunroof device 11 is arranged in the roof 10. The sunroof device 11 includes a tetragonal movable panel 12, which is formed by, for example, a glass plate, and moves in the front-rear direction to open and close the roof opening 10a.

The schematic structure of the sunroof device 11, which is used in opening and closing operations of the movable panel 12 and the like, will now be described.

As shown in FIG. 7, the sunroof device 11 includes two guiderails 13, which are respectively arranged on and fixed to two lateral edges of the roof opening 10a. Each guiderail 13 is formed from, for example, an extrusion of aluminum alloy, and extends in the front-rear direction with a constant cross-section in the longitudinal direction.

A sliding member 31 is guided and supported by each guiderail 13 and movable in the front-rear direction. The movable panel 12, which bridges the two sliding members 31 and two lateral edges of the movable panel 12, are linked to and supported by the two sliding members 31. Movement of the sliding members 31 along the guiderails 13 moves the movable panel 12 to open and close the roof opening 10a.

Further, the sunroof device 11 includes a front housing 16, which is formed from, for example, a resin material, extends in the lateral direction of the vehicle, and is coupled to a front end of each guiderail 13. A drive source 17 (for example, an electric motor including an output gear) is located at an intermediate position of the front housing 16 in the longitudinal direction. The drive source 17 is connected to the two sliding members 31 and drives the sliding members 31 through straight teeth rack belts 21, which serve as a pair of generally belt-shaped drive cables formed from, for example, a resin material. The drive source 17 drives and simultaneously moves the sliding members 31 in the front-rear direction.

More specifically, one of the straight teeth rack belts 21 (hereinafter, also referred to as the straight teeth rack belt 21R) that is connected to the right sliding member 31 (hereinafter, also referred to as the sliding member 31R) is arranged along the front housing 16 at the rear of the drive source 17.

An outer surface of the straight teeth rack belt 21R (surface facing away from the center of the roof opening 10a) includes a driving teeth 22R, which serve as teeth forming ridges and valleys in the inner-outer direction of the vehicle and are arranged at predetermined intervals in the longitudinal direction. The straight teeth rack belt 21R is meshed with the drive source 17 where the driving teeth 22R are located at the rear of the drive source 17. The driving teeth 22R of the straight teeth rack belt 21R are also meshed with the sliding member 31R.

In the same manner, one of the straight teeth rack belts 21 (hereinafter, also referred to as the straight teeth rack belt 21L) that is connected to the left sliding member 31 (hereinafter, also referred to as the sliding member 31L) is arranged along the front housing 16 in front of the drive source 17.

An inner surface of the straight teeth rack belt 21L (surface facing toward the center of the roof opening 10a) includes driving teeth 22L, which serves as teeth forming ridges and valleys in the inner-outer direction of the vehicle and are arranged at predetermined intervals in the longitudinal direction. The straight teeth rack belt 21L is meshed with the drive source 17 where the driving teeth 22L are located in front of the drive source 17. The driving teeth 22L of the straight teeth rack belt 21L is also meshed with the sliding member 31L.

That is, the driving teeth 22 (22R and 22L) that are respectively meshed with the sliding members 31 (31R and 31L) have the same shape as the driving teeth 22 (22R and 22L) that are each meshed with the drive source 17. Therefore, the teeth meshed with the drive source 17 are identically shaped.

The structure of the sunroof device 11 involved in opening and closing operations of the movable panel 12 and the like will now be described.

As shown in FIGS. 1A and 1B, the guiderail 13 includes a generally elongated bottom wall 13a extending in the front-rear direction (the direction orthogonal to the plane of FIG. 13) and two upright walls 13b, which extend upward from the bottom wall 13a and are arranged parallel to each other in the lateral direction of the vehicle. Each guiderail 13 also includes two upper flanges 13c, which project toward each other in the lateral direction of the vehicle from upper ends of the upright walls 13b, and two intermediate flanges 13d, which project toward each other in the lateral direction of the vehicle from intermediate positions of the upright wails 13b in the vertical direction of the vehicle. A projection 13e downwardly projects toward the bottom wall 13a from a distal end of each intermediate flange 13d, and a projection 13f upwardly projects toward each projection 13e from the bottom wall 13a.

The guiderail 13 cooperates with the bottom wall 13a, the upright walls 13b, the intermediate flanges 13d, and the projections 13e and 13f to form first rail portions 14, which have generally C-shaped cross-sections and open in the lateral direction of the vehicle. The guiderail 13 cooperates with the upright walls 13b, the upper flanges 13c, and the intermediate flanges 13d to form second rail portions 15, which have generally U-shaped cross-sections and open in the lateral direction of the vehicle, above the first rail portions 14.

The straight teeth rack belt 21 is coupled in a slidable manner in the front-rear direction to the inner first rail portion 14. The straight teeth rack belt 21 is driven by the electric drive source 17 to move along the first rail portion 14 (guiderail 13) in the front-rear direction. In this case, the adjacent upright wail 13b and the projections 13e and 13f restrict displacement of the straight teeth rack belt 21 relative to the guiderail 13 in the lateral direction of the vehicle. The bottom wall 13a and the adjacent intermediate flange 13d restrict displacement of the straight teeth rack belt 21 relative to the guiderail 13 in the vertical direction of the vehicle.

Figure 2A:
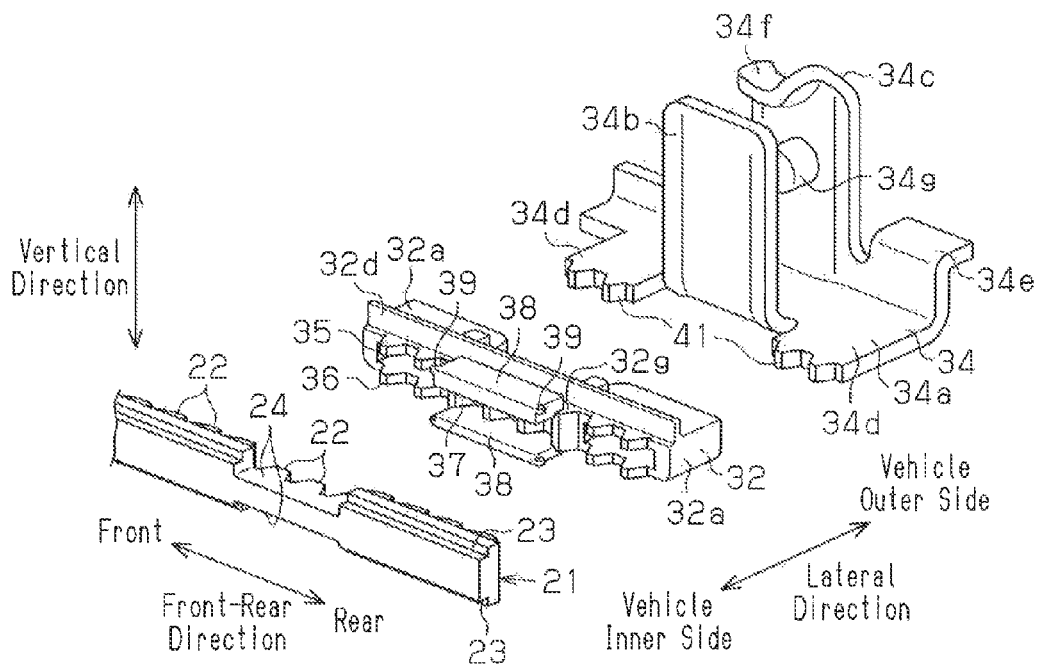
FIGS. 2A and 2B are an exploded perspective view and a perspective view showing the embodiment.
Figure 2B:
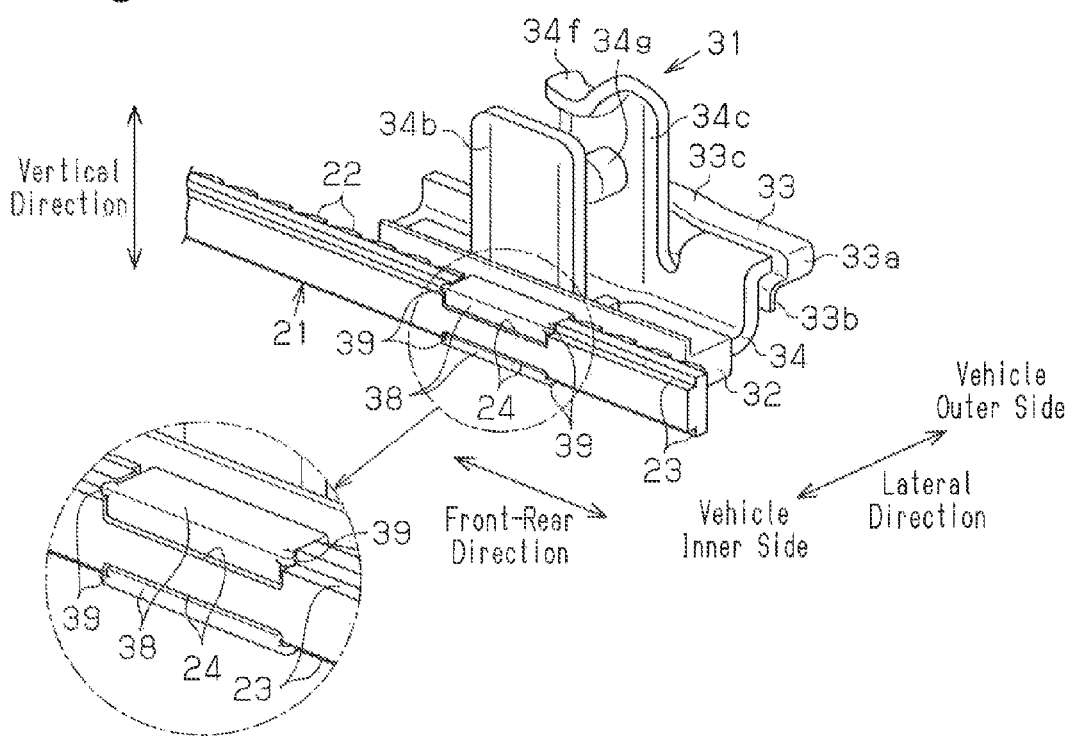

As shown in FIGS. 2A and 2B, substantially the entire length of the inner upper and lower edges of the straight teeth rack belt 21 are chamfered in a tetragonal manner in the longitudinal direction to form two steps 23. Consequently, the two steps 23 result in the straight teeth rack belt 21 having a smaller height at the vehicle inner side than the vehicle outer side. Further, two slots 24, each of which opens in the lateral direction of the vehicle, are formed in a rear end portion of the straight teeth rack belt 21 by cutting out upper and lower edges to form generally U-shaped grooves.

The sliding member 31 is coupled to the straight teeth rack belt 21 to be integrally movable with the straight teeth rack belt 21 in the front-rear direction. The sliding member 31 includes a first resin shoe member 32 and a second resin shoe member 33, which form a shoe member, and a metal plate member 34.

Figure 4A:
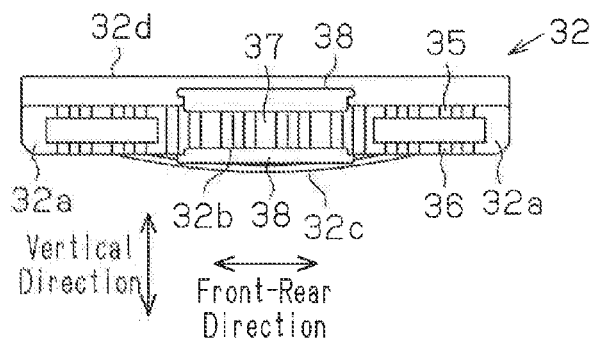
FIGS. 4A to 4C are an elevated view taken from the inner side in the lateral direction of a vehicle showing a first shoe member, a plan view showing the first shoe member, and an elevated view taken from the rear side of the vehicle showing the first shoe member.
Figure 4C:
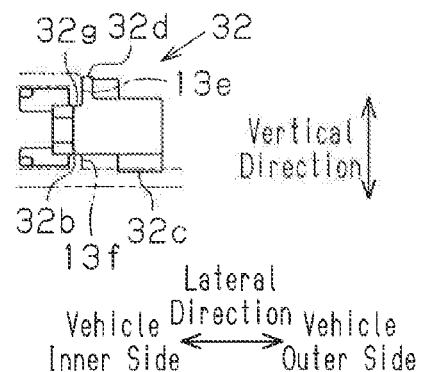
Figure 4B:
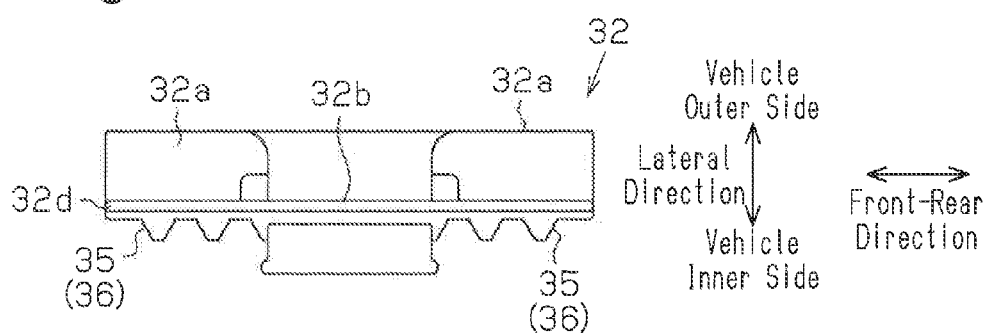

As shown in FIGS. 4A to 4C, the first shoe member 32 includes two fitted portions 32a, which are tetragonal and tubular and are aligned with each other in the front-rear direction, and a generally flat plate-like connection portion 32b, which connects the two fitted portions 32a in the front-rear direction at the vehicle inner side. Shoe side teeth 35 and 36, which form ridges and valleys in the lateral direction of the vehicle, are respectively formed on an upper wail and a lower wail of each fitted portion 32a. In the same manner, driven teeth 37, which include teeth forming ridges and valleys in the lateral direction of the vehicle, are formed on the connection portion 32b. The shoe side teeth 35 and 36 and the driven teeth 37 are aligned in the front-rear direction in intervals that are the same as the driving teeth 22. The shoe side teeth 35 and 36 and the driven teeth 37 are placed on and thereby meshed with the driving teeth 22 in the lateral direction of the vehicle. The fitted portions 32a open in the lateral direction of the vehicle.

Additionally, the first shoe member 32 includes a thin plate-like elastic piece 32c, the two ends of which are respectively connected to the lower surfaces of the two fitted portions 32a. The elastic piece 32c is generally arcuate and downwardly bulged. Further, in the first shoe member 32, a generally elongated restriction piece 32d extends upward from the proximity of the bases of the two upper shoe side teeth 35 and the driven teeth 37. The restriction piece 32d extends along substantially the entire length of the first shoe member 32 in the front-rear direction.

Further, in the first shoe member 32, two generally flange-like positioning protrusions 38 extend from upper and lower edges of the connection portion 32b toward the vehicle inner side (in the lateral direction of the vehicle opposing the slots 24). That is, in the range where the two positioning protrusions 33 are located, the driven teeth 37 are decreased in height. The length of each positioning protrusion 36 in the front-rear direction is set to be slightly shorter than the open width of the slots 24 of the straight teeth rack belt 21 in the front-rear direction. The distance between opposing surfaces of the two positioning protrusions 38 in the vertical direction of the vehicle is set to be slightly greater than the height of the straight teeth rack belt 21 where the slots 2 4 are located in the vertical direction of the vehicle. This allows the two positioning protrusions 38 to be loosely fitted to the two slots 24 in the lateral direction of the vehicle. As shown in FIG. 2A, when the first shoe member 32 is placed on the straight teeth rack belt 21 in the lateral direction of the vehicle, the two positioning protrusions 38 are loosely fitted to the two slots 24. This positions the first shoe member 32 at a certain position relative to the straight teeth rack belt 21 in the front-rear direction when the shoe side teeth 35 and 36 and the driven teeth 37 are meshed with the driving teeth 22. That is, the two positioning protrusions 38 are loosely fitted to the two slots 24 when the shoe side teeth 35 and 36 and the driven teeth 37 are meshed with the driving teeth 22.

As shown in the enlarged view of FIG. 2B, the distal portions of each positioning protrusion 38 includes two hook projections 39 extending from the upper ends in front and rear directions. When the positioning protrusions 38 are loosely fitted to the slots 24, the slots 24 press and squeeze the hook projections 39, which are elastically deformed. Then, when reaching the steps 23 formed at the vehicle inner side of the straight teeth rack belt 21 (the side facing away from the sliding member 31 in the lateral direction of the vehicle), the hook projections 39 are elastically restored and hooked to the steps 23. Thus, when the shoe side teeth 35 and 36 and the driven teeth 37 are meshed with the driving teeth 22, the first shoe member 32 may be temporarily supported by the straight teeth rack belt 21 with the two hook projections 39 of each positioning protrusion 38, which are hooked to the step 23 sandwiching the slot 24 at both sides in the front-rear direction.

As shown in FIG. 2A, the restriction piece 32d and the positioning protrusion 38 sandwich the upper surface of the connection portion 32b and project upward to form a rail guide portion 32g, which is a generally U-shaped groove and communicates the front and rear directions, in the first shoe member 32.

Figure 5:
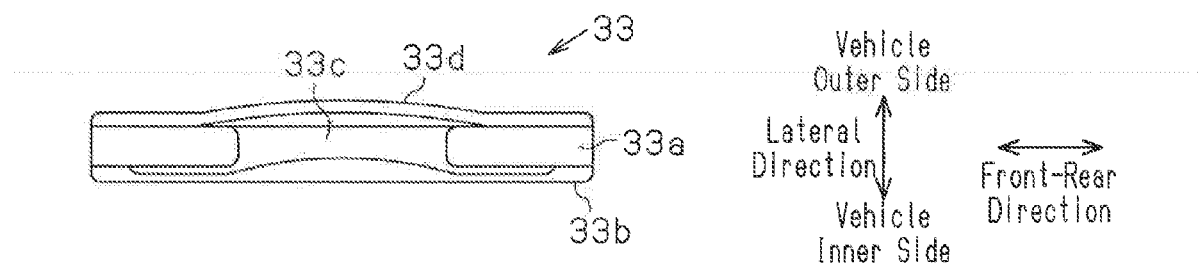
FIG. 5 is a plan view showing a second shoe member.

As shown in FIG. 2B, the second shoe member 33 includes a main body 33a, which has a tetragonal block-like shape with substantially the same length in the front-rear direction as the first shoe member 32, and a generally elongated restriction piece 33b, which extends downward from a lower inner edge of the main body 33a. The restriction piece 33b extends along substantially the entire length of the second shoe member 33 in the front-rear direction. The second shoe member 33 also includes a thin plate-like elastic piece 33c, the two ends of which are connected to an upper surface of the main body 33a at an intermediate position in the front-rear direction. The elastic piece 33c is generally arcuate, bulged upward, and separated from the main body 33a in the upper direction. Further, as shown in FIG. 5, the second shoe member 33 includes a thin plate-like elastic piece 33d, the two ends of which are connected to an outer surface of an intermediate portion of the main body 33a. The elastic piece 33d is generally arcuate, bulged toward the vehicle outer side, and separated from the main body 33a toward the vehicle outer side.

As shown in FIG. 2A, the plate member 34 includes a generally elongated main body 34a, which extends in the front-rear direction, and two upright wails 34b and 34c, which extend upward respectively from the vehicle inner side edge and the vehicle outer edge of the main body 34a at an intermediate portion in the longitudinal direction. The plate member 34 also includes two fitting pieces 34d, which extend toward the vehicle inner side respectively from front and rear ends of the main body 34a sandwiching the inner upright wall 34b.

Figure 3:
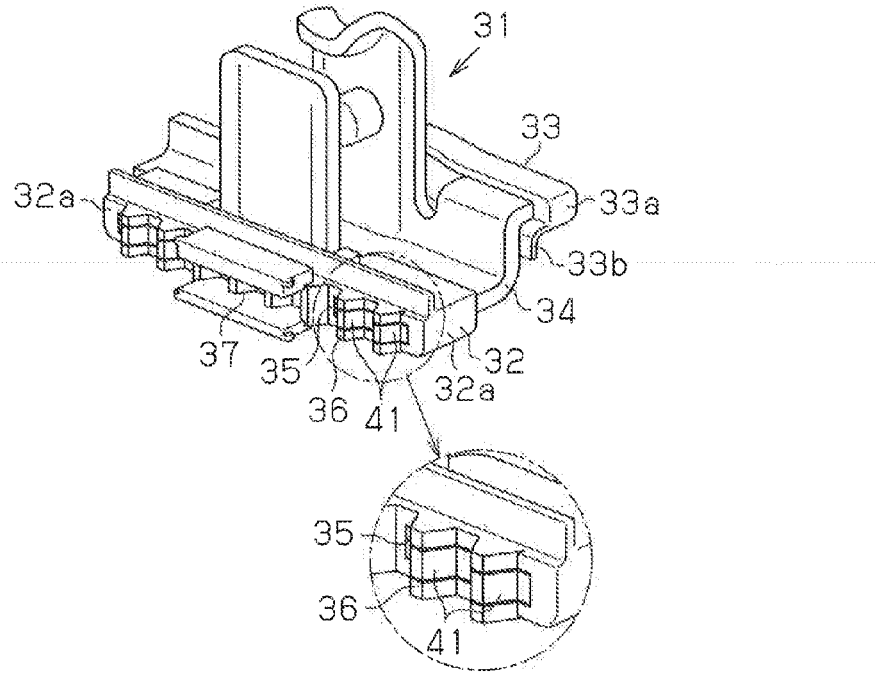
FIG. 3 is a perspective view showing a sliding member and an enlarged view of the sliding member.

Plate side teeth 41, which include a plurality of driven teeth forming ridges and valleys in the lateral direction of the vehicle, are formed on a distal end of each fitting piece 34d. The inner upright wail 34b is fitted to the gap between the two fitted portions 32a of the first shoe member 32, and the two fitting pieces 34d are respectively fitted to the two fitted portions 32a. This connects the plate member 34 to the first shoe member 32 in an integrally movable manner in the front-rear direction. In this case, as shown in the enlarged view of FIG. 3, the plate side teeth 41, which extend through the fitted portion 32a, are set to be overlapped with the shoe side teeth 35 and 36 in the vertical direction of the vehicle. Thus, when the shoe side teeth 35 and 36 and the driven teeth 37 of the first shoe member 32 are meshed with the driving teeth 22, the plate side teeth 41 of the plate member 34 is also meshed with the driving teeth 22.

Additionally, the plate member 34 includes two generally L-shaped fitting pieces 34e, which extend upward then toward the vehicle outer side respectively from front and rear edges of the main body 34a sandwiching the outer upright wail 34c. When distal ends of the two fitting pieces 34e are fitted to the main body 33a, basal ends of the two fitting pieces 34e are located in the proximity or contact the restriction piece 33b of the second shoe member 33. This couples the plate member 34 to the second shoe member in an integrally movable manner.

The sliding member 31, which integrates the first and second shoe members 32 and 33 and the plate member 34, is temporarily held on the straight teeth rack belt 21 by the two hook projections 39 and the like as described above. As shown in FIG. 1B, the sliding member 31 is mounted on the guiderail 13 in the longitudinal direction of the guiderail 13. Thus, the straight teeth rack belt 21 and the sliding member 31, which are meshed with each other as described above, are movable in the front-rear direction along the guiderail 13.

More specifically, the straight teeth rack belt 21 including the two positioning protrusions 38 of the first shoe member 32 is mounted on the first rail portion 14 of the guiderail 13 in a movable manner in the front-rear direction, and the second shoe member 33 is mounted on the second rail portion 15 in a movable manner in the front-rear direction. In this case, the inner surface of the straight teeth rack belt 21 contacts or is located in the proximity of the adjacent upright wall 13b, and the outer surface of the straight teeth rack belt 21 contacts or is located in the proximity of the adjacent projections 13e and 13f. This limits displacement of the straight teeth rack belt 21 in the lateral direction of the vehicle within a fixed range. Additionally, a lower surface of the straight teeth rack belt 21 contacts or is located in the proximity of the bottom wall 13a, and an upper surface of the straight teeth rack belt 21 contacts or is located in the proximity of the adjacent upper flange 13c. This limits displacement of the straight teeth rack belt 21 in the vertical direction of the vehicle within a fixed range.

At the same time, in the first shoe member 32, which is meshed with the straight teeth rack belt 21, the adjacent projection 13e is fitted to the rail guide portion 32g, and an outer distal end face of the lower positioning protrusion 38 contacts or is located in the proximity of the projection 13f. This limits displacement of the first shoe member 32 in the lateral direction of the vehicle within a fixed range. Further, in the first shoe member 32, a lower surface of the lower positioning protrusion 38 contacts or is located in the proximity of the bottom wail 13a, a top face of the upper positioning protrusion 38 contacts or is located in the proximity of the adjacent intermediate flange 13d, and the adjacent projection 13e is inserted into the rail guide portion 32g. This limits displacement of the first shoe member 32 in the vertical direction of the vehicle within a fixed range. In this case, the elastic piece 32c of the first shoe member 32 elastically contacts the bottom wall 13a.

In the second shoe member 33, which is coupled to the first shoe member 32 by the plate member 34, the restriction piece 33b contacts or is located in the proximity of an outer basal end surface of the fitting piece 34e of the plate member 34 and an inner surface of the adjacent projection 13e. This limits displacement of the second shoe member 33 in the lateral direction of the vehicle within a fixed range. In this case, the elastic piece 33c of the second shoe member 33 elastically contacts the adjacent upper flange 13c, and the elastic piece 33d elastically contacts the adjacent upright wall 13b.

In this manner, separation of the straight teeth rack belt 21 from the sliding member 31 in the lateral and vertical directions of the vehicle is restricted. This keeps the shoe side teeth 35 and 36, the plate side teeth 41, and the driven teeth 37 meshed with the driving teeth 22 in the first rail portion 14, Needless to say, in this case, relative movement of the straight teeth rack belt 21 and the sliding member 31 in the front-rear direction is restricted. That is, a driving force (pushing and pulling force) in the front-rear direction from the straight teeth rack belt 21 is transmitted to the sliding member 31 by the meshing of the shoe side teeth 35 and 36, the plate side teeth 41, and the driven teeth 37 with the driving teeth 22. The first and the second rail portions 14 and 15 form a mounted portion.

A generally flange-like engagement piece 34f extends from an upper end portion of the outer upright wall 34c toward the upright wall 34b. Also, a tubular support projection 34g having a closed end projects from an intermediate portion of the upright wall 34c in the vertical direction of the vehicle toward the vehicle inner side. The engagement piece 34f and the support projection 34g are linked to a functional bracket 46, which is, for example, formed by a metal plate. The functional bracket 46 supports lateral edges of the movable panel 12. Movement of the plate member 34 (sliding member 31) in the front-rear direction controls the position of the functional bracket 46 together with the movable panel 12.

The operation of the present embodiment will now be described.

As described above, the sliding member 31, which is temporarily held on the straight teeth rack belt 21 by the two hook projections 39 and the like, is mounted on the guiderail 13. This limits displacement of the straight teeth rack belt 21 and the sliding member 31 in the lateral and vertical directions of the vehicle within a fixed range as described above. Thus, separation of the straight teeth rack belt 21 from the sliding member 31 in the lateral and vertical directions of the vehicle is restricted. This keeps the shoe side teeth 35 and 36, the plate side teeth 41, and the driven teeth 37 meshed with the driving teeth 22. In addition, the sliding member 31 slides on the guiderail 13 in contact with the elastic piece 32c of the first shoe member 32 and the elastic pie 3c and 33d of the second shoe member 33. This reduces the sliding resistance.

Accordingly, the present embodiment has the advantages described below.

(1) In the present embodiment, the straight teeth rack belt 21 and the sliding member 31 are supported in the front-rear direction by meshing the shoe side teeth 35 and 36, the plate side teeth 41, and the driven teeth 37 with the driving teeth 22. The straight teeth rack belt 21 and the sliding member 31, in which the shoe side teeth 35 and 36, the plate side teeth 41, and the driven teeth 37 are meshed with the driving teeth 22, are mounted on the first and second rail portions 14 and 15 (mounted portions). This supports the straight teeth rack belt 21 and the sliding member 31 in the lateral and vertical directions of the vehicle. Consequently, the sliding member 31 may be moved in the front-rear direction integrally with the straight teeth rack belt 21, which is driven by the electric drive source to move in the front-rear direction of the vehicle. In this case, basically, without forming a hole in the straight teeth rack belt 21, the straight teeth rack belt 21 and the sliding member 31 may be integrally moved in the front-rear direction by using the driving teeth 22. This avoids a decrease in the strength of the straight teeth rack belt 21 and thus allows the straight teeth rack belt 21 to be reduced in size.

(2) In the present embodiment, the meshing of the shoe side teeth 35 and 36, the plate side teeth 41, and the driven teeth 37 with the driving teeth is achieved when the two positioning protrusions 38 are loosely fitted to the corresponding slots 24. Thus, the shoe side teeth 35 and 36, the plate side teeth 41, and the driven teeth 37 are meshed with the driving teeth 22 at the desirable positions in the front-rear direction.

(3) In the present embodiment, when each positioning protrusion 36 is loosely fitted to the corresponding slot 24, the two hook projections 39 are hooked to the two steps 23 sandwiching the slot 24 in the front-rear direction. Thus, for example, before being mounted on the guiderail 13 (mounted portion), if the straight teeth rack belt 21 is temporarily coupled to the sliding member 31 when the shoe side teeth 35 and 36, the plate side teeth 41, and the driven teeth 37 are meshed with the driving teeth 22, the two hook projections 39 are each hooked on the step when each positioning protrusion 38 is loosely fitted to the corresponding slot 24. This easily supports the straight teeth rack belt 21 and the sliding member 31 in a temporarily coupled manner and improves coupling features when mounted on the guiderail 13 (mounted portion).

(4) In the present invention, the resin shoe side teeth 35 and 36 are overlapped with the metal plate side teeth 41 in the vertical direction of the vehicle and cooperate with the plate side teeth 41 and the resin shoe side teeth 35 and 36 to be meshed with the driving teeth 22. This ensures the support strength of the straight teeth rack belt 21 and the sliding member 31 in the front-rear direction in a preferred manner.

In addition, by adjusting the number of teeth of the plate side teeth 41, the support strength of the straight teeth rack belt 21 and the sliding member 31 in the front-rear direction may be easily adjusted.

Further, even when a portion of the fitted portion 32a is used for the coupling with the plate member 34 (fitting piece 34d), a decrease in the meshing area with the driving teeth 22 in the vertical direction of the vehicle may be avoided.

(5) In the present embodiment, the sliding member 31 (plate member 34) may be coupled to the straight teeth rack belt 21 without the straight teeth rack belt 21 extending through the sliding member 31 in the lateral direction of the vehicle. Thus, there is no need to set, for example, a cross-sectional shape (that is, cross-shaped cross-sectional shape) in the upright wall 13b of the guiderail 13 that avoids interference with the sliding member. This simplifies the structure of the guiderail 13.

(6) In the present embodiment, the slot 24 may be formed at the same time as when cutting the ends of the straight teeth rack belt 21. Particularly, the slot 24 may be formed in a cutout process, which can be performed with a processing tool smaller than that used to form a hole.

(7) The present embodiment limits displacement of the sliding member 31 from the guiderail 13 in the lateral direction of the vehicle within a fixed range with the two restriction pieces 32d and 33b of the sliding member 31 (the first and the second shoe members 32 and 33). This keeps the shoe side teeth 35 and 36, the plate side teeth 41, and the driven teeth 37 meshed with the driving teeth 22 in a further ensured manner.

(8) In the present embodiment, in the straight teeth rack belt 21, the teeth (driving teeth 22) meshed with the drive source 17 have the same shape as the driving teeth 22. This allows for the teeth meshed with the drive source 17 to have the same shape, and there is no need to design a new shape for the driving teeth that are meshed with the sliding member 31 in the straight teeth rack belt 21.

(9) In the present embodiment, in the first shoe member 32 (shoe member), the plate side teeth 41 (fitting piece 34d) extends through the fitted portion 32a. This supports the plate side teeth 41 in a further ensured manner.

Second Embodiment

A second embodiment of the sunroof device will now be described with reference to FIGS. 8 to 10. The second embodiment mainly differs from the first embodiment in the holding structure used when the sliding member is temporarily coupled to the drive cable. Components that are similar will not be described in detail.

Figure 8A:
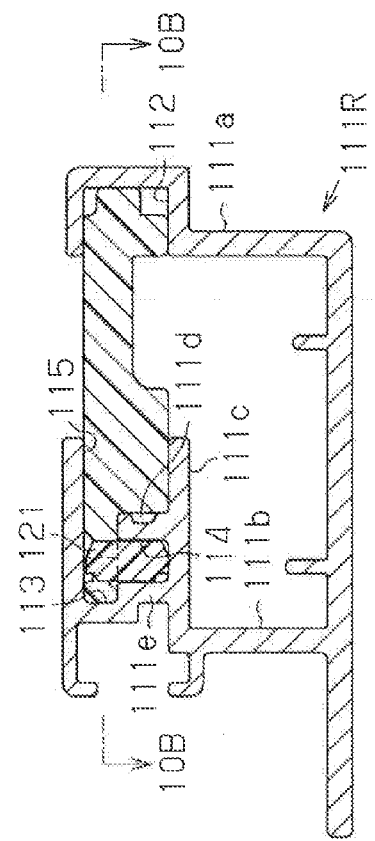
FIGS. 8A and 8B are cross-sectional side views showing a second embodiment of the present invention.

As shown in FIG. 8A, a left side guiderail 111L, which is used in lieu of the guiderail 13, includes two upright walls 111a and 111b aligned in the lateral direction of the vehicle. An upper end of the outer upright wall 111a is connected to a first rail portion 112, which has a generally C-shaped cross-sectional and opens toward the vehicle inner side. A closed side of the first rail portion 112 is located toward the vehicle outer side from the upright wall 111a. An upper end of the inner upright wall 111b is connected to a generally plate-like bottom wall 111c extending toward the vehicle outer side. An upper surface of the bottom wall 111c includes two projections 111d and 111e, which are aligned in the lateral direction of the vehicle and extend upward. An upper end of the inner projection 111e is connected to a second rail portion 113, which has a generally C-shaped cross-section and opens toward the vehicle outer side. A closed side of the second rail portion 113 is located toward the vehicle inner side from the projection 111e. The range of the first rail portion 112 in the vertical direction of the vehicle is set to be the same as the total range of the projection 111e and the second rail portion 113 in the vertical direction of the vehicle.

The bottom wail 111c and the two projections 111d and 111e form a third rail portion 114, which has a generally U-shaped cross-section and opens upward. The bottom wall 111c and an upper wail of the second rail portion 113 form a fourth rail portion 115 having an opening, which opens toward the vehicle outer side and is located toward the vehicle outer side from the projection 111d. Needless to say, the fourth rail portion 115 is opposed to the first rail portion 112 in the lateral direction of the vehicle.

Figure 8B:
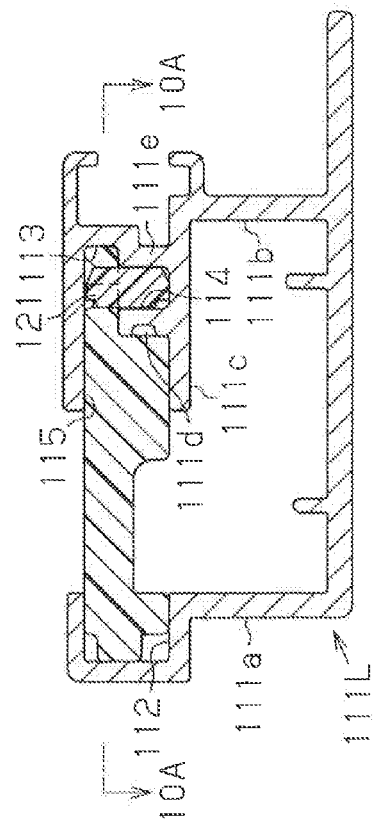

As shown in FIG. 8B, a right side guiderail 111R, which is used in lieu of the guiderail 13, has the same shape as the guiderail 111L although the shape is symmetric. The guiderail 111R also includes the first to fourth rail portions 112 to 115.

A straight teeth rack belt 121, which is used in lieu of the straight teeth rack belt 21, is coupled in a slidable manner in the front-rear direction to the third rail portion 114 of each of the guiderails 111L and 111R. The two projections 111d and 111e limit displacement of each straight teeth rack belt 121 from the corresponding guiderail 111L and 111R in the lateral direction of the vehicle. The bottom wall 111c and the upper wall of the second rail portion 113 limit displacement of each straight teeth rack belt 121 from the corresponding guiderail 111L or 111R in the vertical direction of the vehicle.

Figure 9B:
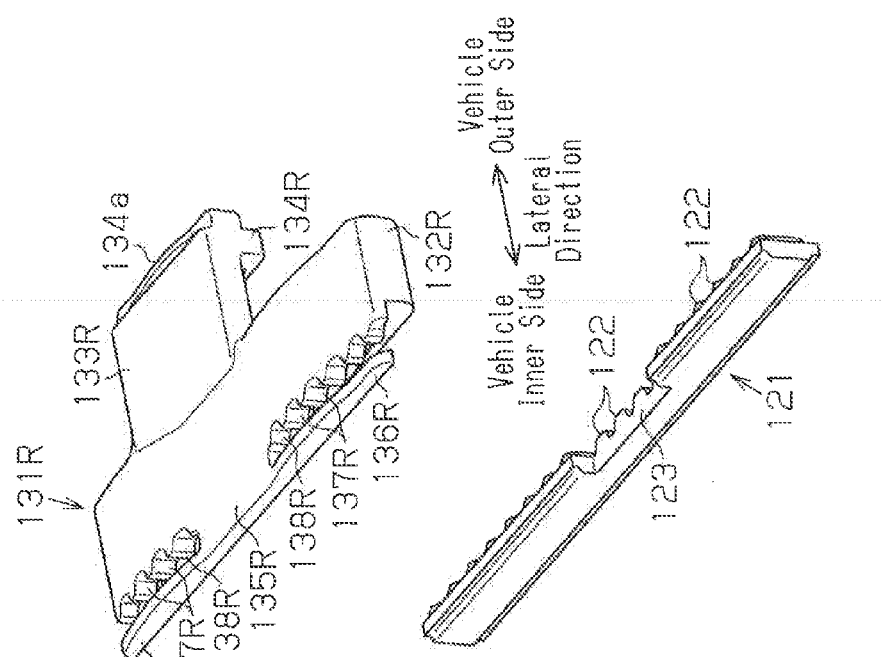
FIGS. 9A and 9B are exploded perspective views showing the embodiment.
Figure 9A:
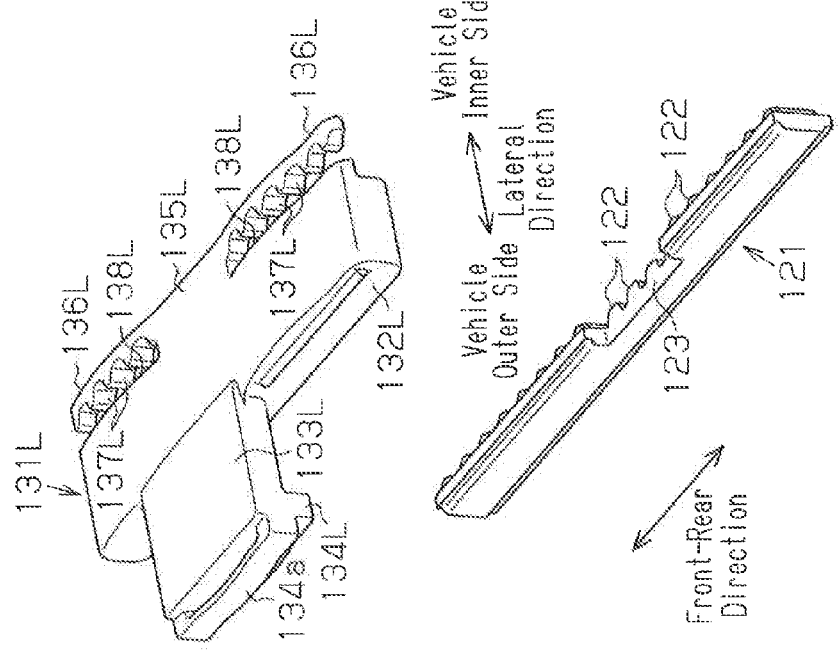
Figure 11:
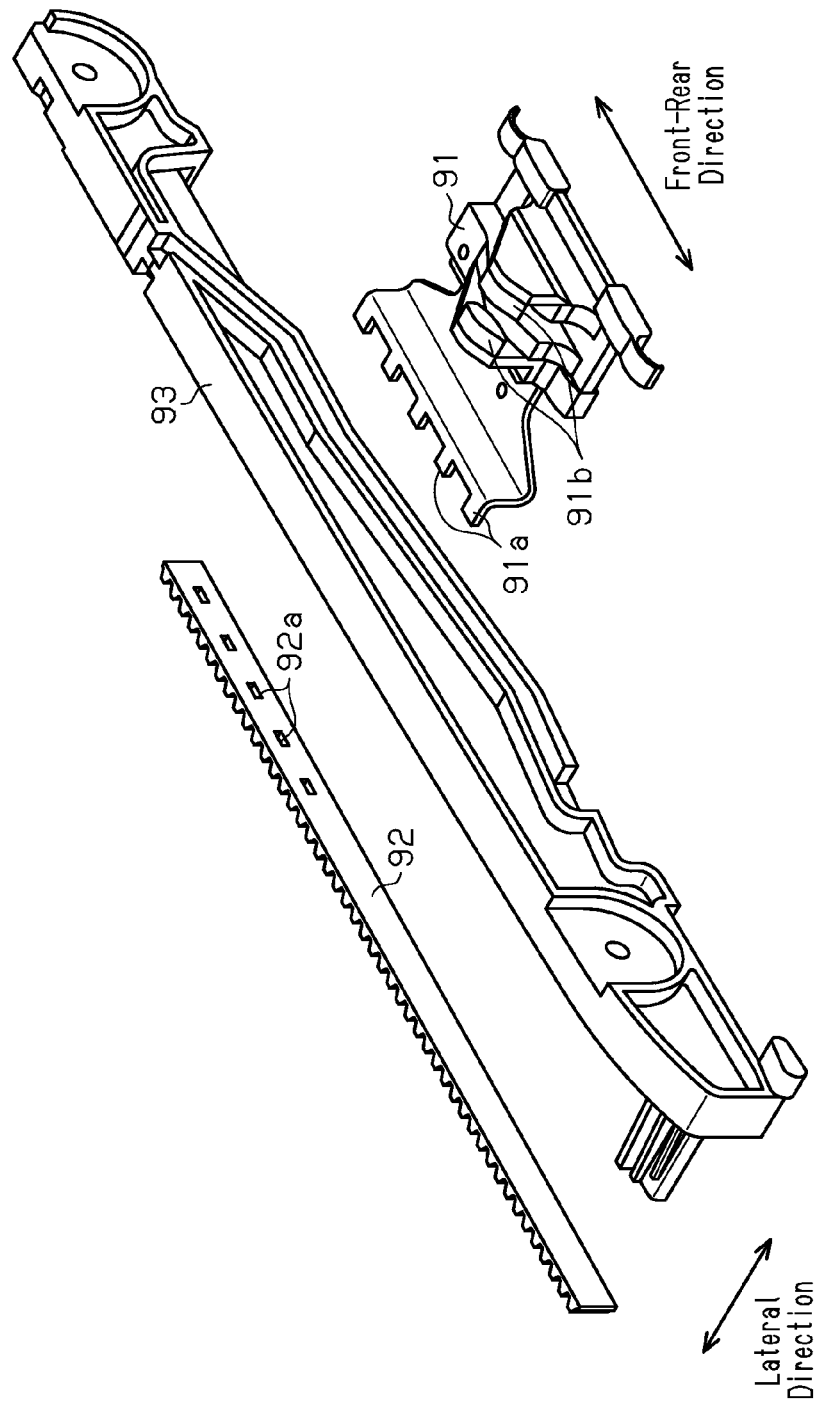
FIG. 11 is an exploded perspective view showing a prior art example.

As shown in FIGS. 9A and 9B, the straight teeth rack belts 121, which are coupled to the corresponding guiderails 111L and 111R, include driving teeth 122, which extend in the same direction. That is, the driving teeth 122 of the left straight teeth rack belt 121 are located at the vehicle inner side, and the driving teeth 122 of the right straight teeth rack belt 121 are located at the vehicle outer side. A slot 123, which opens in the lateral direction of the vehicle, is formed on a rear end portion of each straight teeth rack belt 121 by cutting off an upper edge to form a generally U-shaped groove.

As shown in FIG. 9A, a resin sliding member 131L, which is used in lieu of the sliding member 31 (shoe member), is coupled in an integrally movable manner in the front-rear direction to the left straight teeth rack belt 121. The sliding member 131L includes a vehicle inner side shoe portion 132L, which has a generally block-like shape and extends in the front-rear direction, a generally fiat plate-like connection piece 133L, which extends toward the vehicle outer side from a longitudinally central upper portion of the vehicle inner side shoe portion 132L, and a vehicle outer side shoe portion 134L, which is connected to a distal end of the connection piece 133L and extends downward. The two ends of a thin plate-like elastic piece 134a are connected to an outer surface of the vehicle outer side shoe portion 134L. The elastic piece 134a is generally arcuate and bulged toward the vehicle outer side.

Further, the sliding member 131L includes a positioning protrusion 135L, which has a generally plate-like shape and extends from a longitudinally central upper portion of the vehicle inner side shoe portion 132L in the longitudinal direction toward the vehicle inner side (in the lateral direction of the vehicle opposing the slot 123), and two extension portions 136L, which extend from a distal end of the positioning protrusion 135L toward both sides in the front-rear direction. The length of the positioning protrusion 135L in the front-rear direction is set to be slightly shorter than the open width of the slot 123 of the straight teeth rack belt 121 in the front-rear direction.

A plurality of driven teeth 137L, which form ridges and valleys in the lateral direction of the vehicle, are formed on an outer portion of each extension portion 136L opposed to the vehicle inner side shoe portion 132L. That is, the driven teeth 137L are located at opposite sides of the positioning protrusion 135L in the front-rear direction. The driven teeth 137L, which are aligned in the front-rear direction at the same intervals as the driving teeth 122, may be meshed with the driving teeth 122.

More specifically, as shown in FIG. 10A, the sliding member 131L is overlapped with the straight teeth rack belt 121 in the vertical direction of the vehicle, and the positioning protrusion 135L is loosely fitted to the slot 123. When the sliding member 131L is positioned relative to the straight teeth rack belt 121 at a certain location in the front-rear direction, the driven teeth 137L are meshed with the driving teeth 122. In this case, the vehicle inner side shoe portion 132L contacts or is located in the proximity of a rear surface of the straight teeth rack belt 121 at opposite sides of the positioning protrusion 135L in the front-rear direction. Two opposing portions 138L are formed on portions of the sliding member 131L (vehicle inner side shoe portion 132L) opposed to the two extension portions 136L in the lateral direction of the vehicle. When the driven teeth 137L are meshed with the driving teeth 122, the rear surface of the straight teeth rack belt 121 contacts or is located in the proximity of the two opposing portions 138L. This restricts movement of the sliding member 131L in the lateral direction of the vehicle. The loose fitting of the positioning protrusion 135L to the slot 123 restricts downward movement of the sliding member 131L. In this manner, the straight teeth rack belt 121 temporarily holds the sliding member 131L.

As shown in FIG. 8A, the straight teeth rack belt 121, which temporarily holds the sliding member 131L with the driven teeth 137L meshing the driving teeth 122, is mounted on the third rail portion 114 in a movable manner in the front-rear direction. In this case, in the sliding member 131L, the vehicle outer side shoe portion 134L is mounted on the first rail portion 112 in a movable manner in the front-rear direction, the vehicle inner side shoe portion 132L is mounted on the fourth rail portion 115 in a movable manner in the front-rear direction, and the two extension portions 136L are mounted on the second rail portion 113 in a movable manner in the front-rear direction.

As shown in FIG. 9B, a resin sliding member 131R, which is used in lieu of the sliding member 31 (shoe member), is also coupled to the straight teeth rack belt 121 in an integrally movable manner in the front-rear direction. In the same manner as the sliding member 131L, the sliding member 131R includes a vehicle inner side shoe portion 132R, a connection piece 133R, a vehicle outer side shoe portion 134R, a positioning protrusion 135R, two extension portions 136R, and two opposing portions 138R. However, driven teeth 137R, which form ridges and valleys in the lateral direction of the vehicle, are formed on inner portions of the two opposing portions 138R, which are opposed to the two extension portions 136R. The driven teeth 137R, which are aligned in the front-rear direction at the same intervals as the driving teeth 122, may be meshed with the driving teeth 122.

More specifically, as shown in FIG. 10B, the sliding member 131R is overlapped with the straight teeth rack belt 121 in the vertical direction of the vehicle, and the positioning protrusion 135R is loosely fitted to the slot 123. This positions the sliding member 131R at a certain location relative to the straight teeth rack belt 121 in the front-rear direction when the driven teeth 137R are meshed with the driving teeth 122. In this case, the two extension portions 136R contact or are located in the proximity of the surface of the straight teeth rack belt 121 at opposite sides of the positioning protrusion 135R in the front-rear direction. When the driven teeth 137R are meshed with the driving teeth 122, the rear surface of the straight teeth rack belt 121 contacts or is located in the proximity of the two extension portions 136R. This restricts movement of the sliding member 131R in the lateral direction of the vehicle. The loose fitting of the positioning protrusion 135R to the slot 123 restricts downward movement of the sliding member 131R.

As shown in FIG. 8B, the straight teeth rack belt 121, which temporarily holds the sliding member 131R with the driven teeth 137R meshing the driving teeth 122, is mounted on the third rail portion 114. In this case, in the sliding member 131R, the vehicle outer side shoe portion 134R is mounted on the first rail portion 112 in a movable manner in the front-rear direction, the vehicle inner side shoe portion 132R is mounted on the fourth rail portion 115 in a movable manner in the front-rear direction, and the two extension portions 136R is mounted on the second rail portion 113 in a movable manner in the front-rear direction.

An appropriate support member, which functions as the plate member 34, (not shown in the drawings) is coupled to each of the sliding members 131L and 131R in an integrally movable manner in the front-rear direction. The support member is connected to the functional bracket 46.

The operation of the present embodiment will now be described.

As described above, when the sliding members 131L and 131R are temporarily held on the straight teeth rack belt 121, the sliding members 131L and 131R are mounted on the corresponding guiderails 111L and 111R. This restricts displacement of the straight teeth rack belt 121 and the sliding members 131L and 131R in the lateral and vertical directions of the vehicle within a fixed range as described above. Thus, separation of the straight teeth rack belt 121 from the sliding members 131L and 131R in the lateral and vertical directions of the vehicle is restricted. This keeps the driven teeth 137L and 137R meshed with the driving teeth 122.

As described above in detail, the present embodiment has the following advantages in addition to advantages (1), (2), (5), (6), and (8) of the first embodiment.

(1) In the present embodiment, when the driving teeth 122 are meshed with the driven teeth 137L, the rear surface of the straight teeth rack belt 121 is held by the two opposing portions 138L. This temporarily holds the straight teeth rack belt 121 on the sliding member 131L. In the same manner, when the driving teeth 122 are meshed with the driven teeth 137R, the rear surface of the straight teeth rack belt 121 is held by the two extension portions 136R. This temporarily holds the straight teeth rack belt 121 on the sliding member 131R. Thus, coupling features may be improved when mounting the straight teeth rack belt 121 and the sliding members 131L and 131R, in which the driving teeth 122 are meshed with the driven teeth 137L and 137R, on the guiderails 111L and 111R (mounted portions).

The above embodiments may be modified as follows.

In the first embodiment, the portion of the driving teeth 22 that are meshed with the shoe side teeth 35 and 36 of the sliding member 31 may face the vehicle outer side or the vehicle inner side by twisting one of the straight teeth rack belts 21R and 21L or the like.

In the first embodiment, the two restriction pieces 32d and 33b of the sliding member 31 (first and second shoe members 32 and 33) may be omitted.

In the first embodiment, the sliding member including the plate member may be formed integrally from only a resin. In other words, there is no need for cooperation with a metal portion (plate side teeth 41) when meshing the straight teeth rack belt 21 with the sliding member.

In the first embodiment, the mounted portion is formed in cooperation with the first and the second rail portions 14 and 15. However, the mounted portion may have any structure as long as the straight teeth rack belt 21 and the sliding member 31, which are meshed with each other, are supported in the lateral and vertical directions of the vehicle.

In the first embodiment, the two steps 23 are arranged at opposite sides of the straight teeth rack belt 21 in the vertical direction of the vehicle. However, at least one of the steps 23 may be omitted. Accordingly, the two hook projections 39 arranged at the corresponding side of the positioning protrusion 38 may be omitted.

In the first embodiment, instead of the step 23 of the straight teeth rack belt 21 and the hook projection 39 of the sliding member 31, an appropriate holding portion may be employed to support the straight teeth rack belt 21 and the sliding member 31 in a temporarily coupled manner. This also easily supports the straight teeth rack belt 21 and the sliding member 31 in a temporarily coupled manner and improves the coupling features when mounted on the guiderail 13 (mounted portion).

In the first embodiment, a pair of the slots 24 is arranged at both sides of the straight teeth rack belt 21 in the vertical direction of the vehicle. However, at least one of the slots 24 may be omitted. Accordingly, at least one of the positioning protrusions 38 arranged at both sides of the sliding member 31 (first shoe member 32) in the vertical direction of the vehicle.

In the first embodiment, instead of the slot 24 and the positioning protrusion 38, an appropriate positioning portion may be arranged in the straight teeth rack belt 21 and the sliding member 31 to determine the position where the shoe side teeth 35 and 36, the plate side teeth 41, and the driven teeth 37 are meshed with the driving teeth 22. In this case, the positioning portion also meshes the shoe side teeth 35 and 36, the plate side teeth 41, and the driven teeth 37 with the driving teeth 22. Thus, the shoe side teeth 35 and 36 and the plate side teeth 41 are meshed with the driving teeth 22 at the desirable position positions in the front-rear direction of the vehicle.

In the second embodiment, an elastic piece having a generally arcuate shape, which is bulged downward, may be located on lower surfaces of the vehicle inner side shoe portions 132L and 132R or the vehicle outer side shoe portions 134L and 134R.

The second embodiment may have a structure that arranges the sliding member 131L or the sliding member 131R at both left and right sides. In this case, if necessary, the corresponding straight teeth rack belt 121 may be twisted so that the driving teeth 122 of the straight teeth rack belt 121 are meshed with the driven teeth 137L of the sliding member 131L or the driven teeth 137R of the sliding member 131R.

In the second embodiment, the second rail portion 113 may be located at the vehicle outer side of the guiderail 111L and the vehicle outer side of the guiderail 111R. In this case, preferably, the sliding member 131R is arranged in the second rail portion 113 of the guiderail 111L, and the sliding member 131L is arranged in the second rail portion 113 of the guiderail 111R.

In the second embodiment, the mounted portion is formed in cooperation with the first to fourth rail portions 112 to 115. However, the mounted portion may have any structure as long as the straight teeth rack belt 121 and the sliding members 131L and 131R, which are meshed with each other, are held in the lateral and vertical directions of the vehicle.

In each of the embodiments, instead of the straight teeth rack belts 21 and 121, which serve as the drive cables, for example, a cylindrical cable (geared cable) including helical teeth (so-called threads) may be employed. In this case, a sliding member including driven teeth that can be meshed with driving teeth of the geared cable may be employed.

In each of the embodiments, besides the teeth, which are meshed with the drive source 17, the straight teeth rack belts 21 and 121 may each include driving teeth, which differ in shape from the teeth meshed with the drive source 17. For example, the driving teeth and the teeth, which are meshed with the drive source 17, may be located in areas independent from each other in the longitudinal direction of each of the straight teeth rack belts 21 and 121.

Each of the embodiments may position the sliding members 31, 131L, and 131R corresponding to the straight teeth rack belts 21 and 121 in the front-rear direction, for example, by matching appropriate marks (figures or the like) arranged on the straight teeth rack belts 21 and 121 and the sliding members 31, 131L, and 131R.

In each of the embodiments, the slots 24 and 123 each may be fitted to the corresponding positioning protrusion 33, 135L, and 135R.

DESCRIPTION OF REFERENCE SYMBOLS

10 Roof (Roof Portion)
10a Roof Opening (Opening Portion)
11 Sunroof Device
12 Movable Panel
13, 111L, 111R Guiderail
14, 112 First Rail Portion (Mounted Portion)
15, 113 Second Rail Portion (Mounted Portion)
17 Drive Source
21, 21R, 21L, 121 Straight Teeth Rack Belt (Drive Cable)
22, 22R, 22L, 122 Driving Teeth (Teeth)
23 Step (Holding Portion)
24 Slot (Positioning Portion)
31, 31R, 31L, 131L, 131R Sliding Member
32 First Shoe Member (Shoe Member)
32a Fitted Portion
33 Second Shoe Member (Shoe Member)
34 Plate Member
35, 36 Shoe Side Teeth (Driven Teeth)
37, 137L, 137R Driven Teeth
38 Positioning Protrusion (Positioning Portion)
39 Hook Projection (Holding Portion)
41 Plate Side Teeth (Driven Teeth)
46 Functional Bracket
114 Third Rail Portion (Mounted Portion)
115 Fourth Rail Portion (Mounted Portion)
135L, 135R Positioning Protrusion
136L, 136R Extension Portion
138L, 138R Opposing Portion

The invention claimed is:

1. A sunroof device comprising:
a functional bracket configured to support a lateral edge of a movable panel that opens and closes an opening formed in a roof portion of a vehicle;
a guiderail configured to be located at a lateral edge of the opening and extend in the front-rear direction of the vehicle;
a drive member that includes driving teeth arranged along the drive member, wherein the drive member is driven to move along the guiderail in the front-rear direction of the vehicle;
a sliding member that is linked to the functional bracket and arranged to be movable in the front-rear direction of the vehicle along the guiderail, wherein the sliding member controls a position of the functional bracket together with the movable panel when moving in the front-rear direction of the vehicle;
driven teeth formed on the sliding member, wherein the driven teeth are meshed with the driving teeth and restrict relative movement of the drive member and the sliding member in the front-rear direction of the vehicle;
a mounted portion formed on the guiderail, wherein the drive member and the sliding member, in which the driving teeth are meshed with the driven teeth, are mounted on the mounted portion, and the mounted portion holds the drive member and the sliding member in the lateral and vertical directions of the vehicle;
a slot formed in a heightwise edge of the drive member, wherein the slot opens in the lateral direction of the vehicle;
a positioning protrusion that protrudes from the sliding member in the lateral direction of the vehicle opposed to the slot, wherein the positioning protrusion is loosely fitted to the slot when the driving teeth are meshed with the driven teeth;
a step formed on the heightwise edge of the drive member where the step is formed along substantially the entire length in the longitudinal direction, wherein the step decreases the height of the drive member at a side separated from the sliding member; and
two hook projections that project toward the front and rear directions from a lateral, distal end of the positioning protrusion, wherein the hook projections are hooked to the step at both sides of the slot to sandwich the slot in the front-rear direction of the vehicle.

2. The sunroof device according to claim 1, wherein the drive member includes teeth arranged at fixed intervals, and the sunroof device comprises a drive source meshed with the teeth, wherein the drive source drives the drive member, and the teeth and the driving teeth have the same shape.

3. The sunroof device according to claim 1, wherein the slot and the positioning protrusion and the step comprise a holding portion that holds the drive member and the sliding member in a temporarily coupled manner.

4. The sunroof device according to claim 1, wherein
the sliding member includes
a resin shoe member that includes shoe side teeth, wherein the shoe member is capable of sliding in the front-rear direction of the vehicle along the guiderail, and
a metal plate member that includes plate side teeth, wherein the plate member is attached to the shoe member and linked to the functional bracket, and
the driven teeth are formed by cooperation of the shoe side teeth and the plate side teeth, which are overlapped in the vertical direction of the vehicle.

5. The sunroof device according to claim 4, wherein the shoe side teeth include a tubular fitted portion through which the plate side teeth extend.

* * * * *